(12) United States Patent
Wu et al.

(10) Patent No.: US 12,088,379 B2
(45) Date of Patent: Sep. 10, 2024

(54) CSI ACQUISITION FOR PARTIAL RECIPROCITY

(71) Applicant: QUALCOMM Incorporated, San Diego, CA (US)

(72) Inventors: Liangming Wu, Beijing (CN); Chao Wei, Beijing (CN); Yu Zhang, Beijing (CN); Chenxi Hao, Beijing (CN); Qiaoyu Li, Beijing (CN); Min Huang, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/594,856

(22) PCT Filed: May 31, 2019

(86) PCT No.: PCT/CN2019/089497
§ 371 (c)(1),
(2) Date: Nov. 1, 2021

(87) PCT Pub. No.: WO2020/237619
PCT Pub. Date: Dec. 3, 2020

(65) Prior Publication Data
US 2022/0311492 A1    Sep. 29, 2022

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0486* (2013.01); *H04B 7/0632* (2013.01); *H04B 7/0639* (2013.01); *H04L 5/0051* (2013.01)

(58) Field of Classification Search
CPC .. H04B 7/0626; H04B 7/0632; H04B 7/0639; H04B 7/0486; H04L 5/0051; H04L 5/0057
See application file for complete search history.

(56) References Cited

U.S. PATENT DOCUMENTS

2013/0201946 A1*  8/2013  Lunttila ............... H04W 24/02
                                                         370/328
2013/0322376 A1* 12/2013  Marinier ............. H04L 5/0057
                                                         370/329
(Continued)

FOREIGN PATENT DOCUMENTS

| CN | 106160952 A | 11/2016 |
| CN | 109417404 A | 3/2019 |
| WO | 2019099817 A1 | 5/2019 |

OTHER PUBLICATIONS

Supplementary European Search Report—EP19930881—Search Authority—The Hague—Nov. 25, 2022.
(Continued)

*Primary Examiner* — Brian D Nguyen
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may transmit a sounding reference signal (SRS) that indicates that the UE is configured with a quantity of receive elements that is greater relative to a quantity of transmit elements with which the UE is configured. The UE may receive, based at least in part on transmitting the SRS, a first channel state information (CSI) reference signal (CSI-RS) set and a second CSI-RS set. The UE may transmit a CSI report that is based at least in part on the first CSI-RS set and the second CSI-RS set. Numerous other aspects are provided.

34 Claims, 12 Drawing Sheets

(56) References Cited

U.S. PATENT DOCUMENTS

| | | | |
|---|---|---|---|
| 2016/0182137 A1* | 6/2016 | Onggosanusi | H04B 7/0478 370/329 |
| 2018/0278316 A1 | 9/2018 | Yang et al. | |
| 2018/0323846 A1 | 11/2018 | Tsai et al. | |
| 2019/0013909 A1* | 1/2019 | Li | H04L 5/0048 |
| 2019/0059013 A1* | 2/2019 | Rahman | H04B 7/0478 |
| 2019/0296815 A1* | 9/2019 | Onggosanusi | H04B 7/0645 |
| 2020/0155488 A1* | 5/2020 | Chandraratna | A61K 9/0073 |
| 2021/0345253 A1* | 11/2021 | Matsumura | H04B 7/0404 |
| 2022/0287068 A1* | 9/2022 | Lin | H04L 5/0094 |

OTHER PUBLICATIONS

ZTE: "On Reciprocity based CSI Acquisition", 3GPP TSG RAN WG1 NR AdHoc#2, R1-1710189, On Reciprocity Based CSI Acquisition, 3rd Generation Partnership Project, Mobile Competence Centre, 650, Route Des Lucioles, F-06921 Sophia-Antipolis Cedex, France, vol. RAN WG1, No. Jun. 30, 2017, Qingdao, China, Jun. 27-30, 2017, Jun. 17, 2017, XP051304864, 7 pages, the whole document.

Huawei, et al., "Discussion on Reciprocity Based CSI Acquisition Mechanism," 3GPP Draft, 3GPP TSG RAN WG1 Meeting #89, R1-1708137, 3rd Generation Partnership Project (3GPP), Mobile Competence Centre, 650, Route Des Lucioles, F-06921, Sophia-Antipolis Cedex, France, vol. RAN WG1, No. Hangzhou, China; May 15, 2017-May 19, 2017, May 19, 2017, XP051273333, 10 Pages, Retrieved from the Internet: URL: http://www.3gpp.org/ftp/Meetings_3GPP_SYNC/RAN1/Docs/ [retrieved on May 14, 2017] Section 2.

Huawei, et al., "Partial Reciprocity Based CSI Acquisition Mechanism," 3GPP TSG RAN WG1 NR Ad-Hoc#3, R1-1715722, Sep. 21, 2017, (Sep. 21, 2017), 6 pages, Section 3.

International Search Report and Written Opinion—PCT/CN2019/089497—ISA/EPO—Mar. 2, 2020.

Nokia, et al., "On the Channel Reciprocity Support for CSI Acquisition," 3GPP TSG RAN WG1 #90, R1-1714245, Aug. 25, 2017 (Aug. 25, 2017), 4 pages, the whole document.

Qualcomm Incorporated: "CSI Acquisition for Reciprocity Based Operation", 3GPP Draft, 3GPP TSG RAN WG1 #89, R1-1708591, 3rd Generation Partnership Project (3GPP), Mobile Competence Centre; 650, Route Des Lucioles; F-06921 Sophia-Antipolis Cedex, France, vol. RAN WG1, No. Hangzhou, China; May 15, 2017-May 19, 2017, May 7, 2017 (May 7, 2017), XP051263230, May 14, 2017, pp. 1-5, URL: http://www.3gpp.org/ftp/tsg_ran/WG1_RL1/TSGR1_89/Docs/.

* cited by examiner

CSI ACQUISITION FOR PARTIAL RECIPROCITY

CROSS-REFERENCE TO RELATED APPLICATION

This application is a 371 national stage of PCT Application No. PCT/CN2019/0089497 filed on May 31, 2019, entitled "CSI ACQUISITION FOR PARTIAL RECIPROCITY," which is hereby expressly incorporated by reference herein.

TECHNICAL FIELD

Aspects of the technology described below generally relate to wireless communication and to techniques and apparatuses for channel state information (CSI) acquisition for partial reciprocity. Some techniques and apparatuses described herein enable and provide wireless communication devices and systems configured for multiple input multiple output (MIMO) scenarios, increased data rates, and spectral efficiency.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a new radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

A user equipment (UE) and a base station (BS) may perform wireless communication in a wireless network. To facilitate bandwidth selection and parameters for the wireless communication link between the UE and the BS, a UE may transmit a sounding reference signal (SRS) to the BS. The BS may perform one or more measurements of the SRS (which may be referred to as a channel estimation) and may select the bandwidth and/or other parameters for the wireless communication link based at least in part on the results of the one or more measurements. In some cases, a UE may support full reciprocity, in which case the UE is configured and/or equipped with an equal quantity of transmit elements (e.g., antennas, antenna arrays, antenna panels, and/or the like) and receive elements. In this case, the BS may use the result of an uplink channel estimation for downlink channel estimation due to the equality between the transmit elements and receive elements of the UE. However, if a UE is configured and/or equipped with an unequal quantity of transmit elements and receive elements (which may be referred to as partial reciprocity), the BS may be unable to estimate the downlink based at least in part on full reciprocity with the uplink.

Some techniques and apparatuses described herein provide channel state information (CSI) acquisition for partial reciprocity. A UE that may not support full reciprocity (e.g., a UE that is configured and/or equipped with a greater quantity of receive elements relative to a quantity of transmit elements) may transmit an SRS to a BS. The BS may transmit, to the UE, a first CSI reference signal (CSR-RS) set and a second CSI-RS set. Transmissions of the first CSI-RS set may be precoded based at least in part on the SRS. Transmissions of the second CSI-RS set may be non-precoded and/or may be precoded using a precoder that is orthogonal to a precoder that is used to precode the transmissions of the first CSI-RS set. The UE may generate a CSI report that is based at least in part on the first CSI-RS set and the second CSI-RS set. The CSI report may indicate various joint and/or individual channel estimation parameters, such as a joint and/or individual precoder matrix indicators (PMIs), joint and/or individual rank indicators (RIs), joint and/or individual channel quality indicators (CQIs), joint and/or individual CSI-RS resource indicators (CRIs), and/or the like. In this way, the joint and/or individual channel estimation parameters that are determined from a combination of a precoded CSI-RS set (e.g., based at least in part on an SRS transmitted from the UE) and a precoded or non-precoded CSI-RS set increases the accuracy and performance of the CSI report and reduces the payload of the CSI report, and may be used by the BS to improve downlink channel quality for partial reciprocity.

In some aspects, a method of wireless communication, performed by a UE, may include transmitting an SRS that indicates that the UE is configured with a quantity of receive elements that is greater relative to a quantity of transmit elements with which the UE is configured; receiving, based at least in part on transmitting the SRS, a first CSI-RS set and a second CSI-RS set; and transmitting a CSI report that is based at least in part on the first CSI-RS set and the second CSI-RS set.

In some aspects, a UE for wireless communication may include memory and one or more processors operatively coupled to the memory. The memory and the one or more processors may be configured to transmit an SRS that indicates that the UE is configured with a quantity of receive elements that is greater relative to a quantity of transmit elements with which the UE is configured; receive, based at least in part on transmitting the SRS, a first CSI-RS set and a second CSI-RS set; and transmit a CSI report that is based at least in part on the first CSI-RS set and the second CSI-RS set.

In some aspects, a non-transitory computer-readable medium may store one or more instructions for wireless communication. The one or more instructions, when executed by one or more processors of a UE, may cause the one or more processors to transmit an SRS that indicates that the UE is configured with a quantity of receive elements that is greater relative to a quantity of transmit elements with which the UE is configured; receive, based at least in part on transmitting the SRS, a first CSI-RS set and a second CSI-RS set; and transmit a CSI report that is based at least in part on the first CSI-RS set and the second CSI-RS set.

In some aspects, an apparatus for wireless communication may include means for transmitting an SRS that indicates that the apparatus is configured with a quantity of receive elements that is greater relative to a quantity of transmit elements with which the apparatus is configured; means for receiving, based at least in part on transmitting the SRS, a first CSI-RS set and a second CSI-RS set; and means for transmitting a CSI report that is based at least in part on the first CSI-RS set and the second CSI-RS set.

In some aspects, a method of wireless communication, performed by a BS, may include receiving, from a UE, an SRS that indicates that the UE is configured with a quantity of receive elements that is greater relative to a quantity of transmit elements with which the UE is configured; transmitting, based at least in part on receiving the SRS, a first CSI-RS set and a second CSI-RS set; and receiving, from the UE, a CSI report that is based at least in part on the first CSI-RS set and the second CSI-RS set.

In some aspects, a BS for wireless communication may include memory and one or more processors operatively coupled to the memory. The memory and the one or more processors may be configured to receive, from a UE, an SRS that indicates that the UE is configured with a quantity of receive elements that is greater relative to a quantity of transmit elements with which the UE is configured; transmit, based at least in part on receiving the SRS, a first CSI-RS set and a second CSI-RS set; and receive, from the UE, a CSI report that is based at least in part on the first CSI-RS set and the second CSI-RS set.

In some aspects, a non-transitory computer-readable medium may store one or more instructions for wireless communication. The one or more instructions, when executed by one or more processors of a BS, may cause the one or more processors to receive, from a UE, an SRS that indicates that the UE is configured with a quantity of receive elements that is greater relative to a quantity of transmit elements with which the UE is configured; transmit, based at least in part on receiving the SRS, a first CSI-RS set and a second CSI-RS set; and receive, from the UE, a CSI report that is based at least in part on the first CSI-RS set and the second CSI-RS set.

In some aspects, an apparatus for wireless communication may include means for receiving, from a UE, an SRS that indicates that the UE is configured with a quantity of receive elements that is greater relative to a quantity of transmit elements with which the UE is configured; means for transmitting, based at least in part on receiving the SRS, a first CSI-RS set and a second CSI-RS set; and means for receiving, from the UE, a CSI report that is based at least in part on the first CSI-RS set and the second CSI-RS set.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
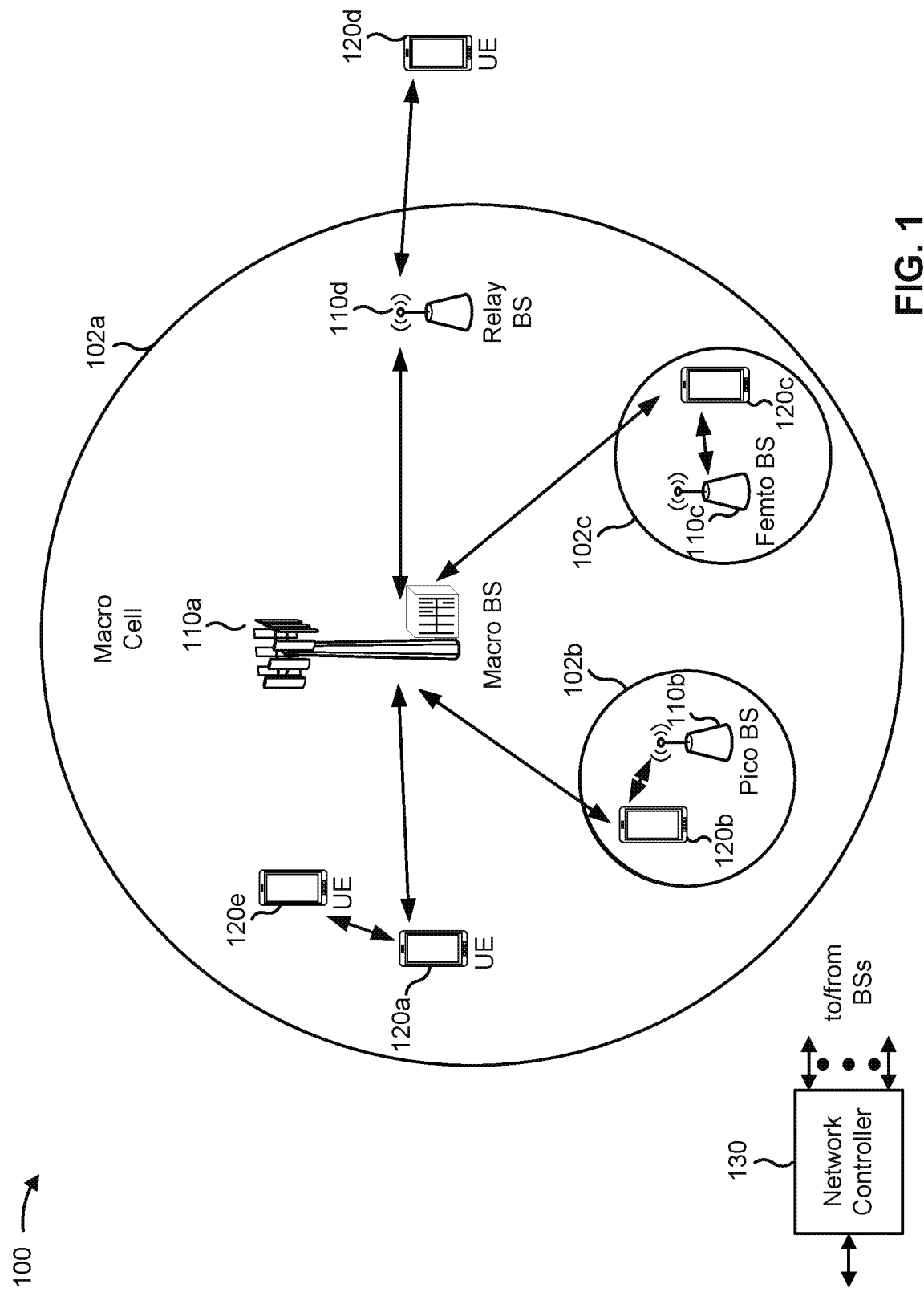
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
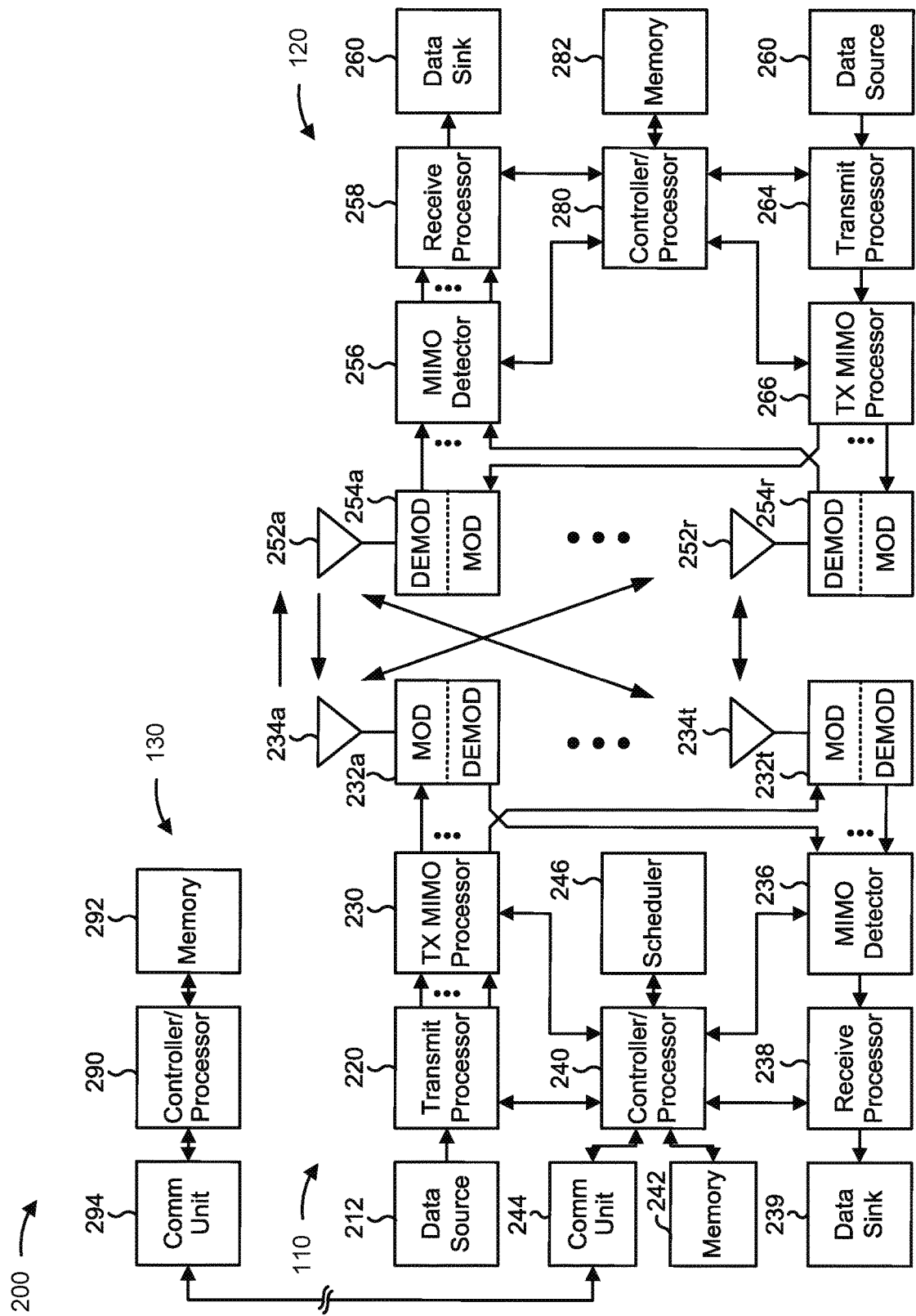
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink RF signals may be received from and/or may be transmitted by one or more base stations 110. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with channel state information (CSI) acquisition for partial reciprocity, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means may include means for transmitting a sounding reference signal (SRS) that indicates that the UE 120 is configured with a quantity of receive elements that is greater relative to a quantity of transmit elements with which the UE 120 is configured, means for receiving, based at least in part on transmitting the SRS, a first CSI reference signal (CSI-RS) set and a second CSI-RS set, means for transmitting a CSI report that is based at least in part on the first CSI-RS set and the second CSI-RS set, and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the base station 110 may include a variety of means or components for implementing communication functions. For example, the variety of means may include means for receiving, from a UE 120, an SRS that indicates that the UE 120 is configured with a quantity of receive elements that is greater relative to a quantity of transmit elements with which the UE 120 is configured, means for transmitting, based at least in part on receiving the SRS, a first CSI-RS set and a second CSI-RS set, means for receiving, from the UE, a CSI report that is based at least in part on the first CSI-RS set and the second CSI-RS set, and/or the like.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3A:
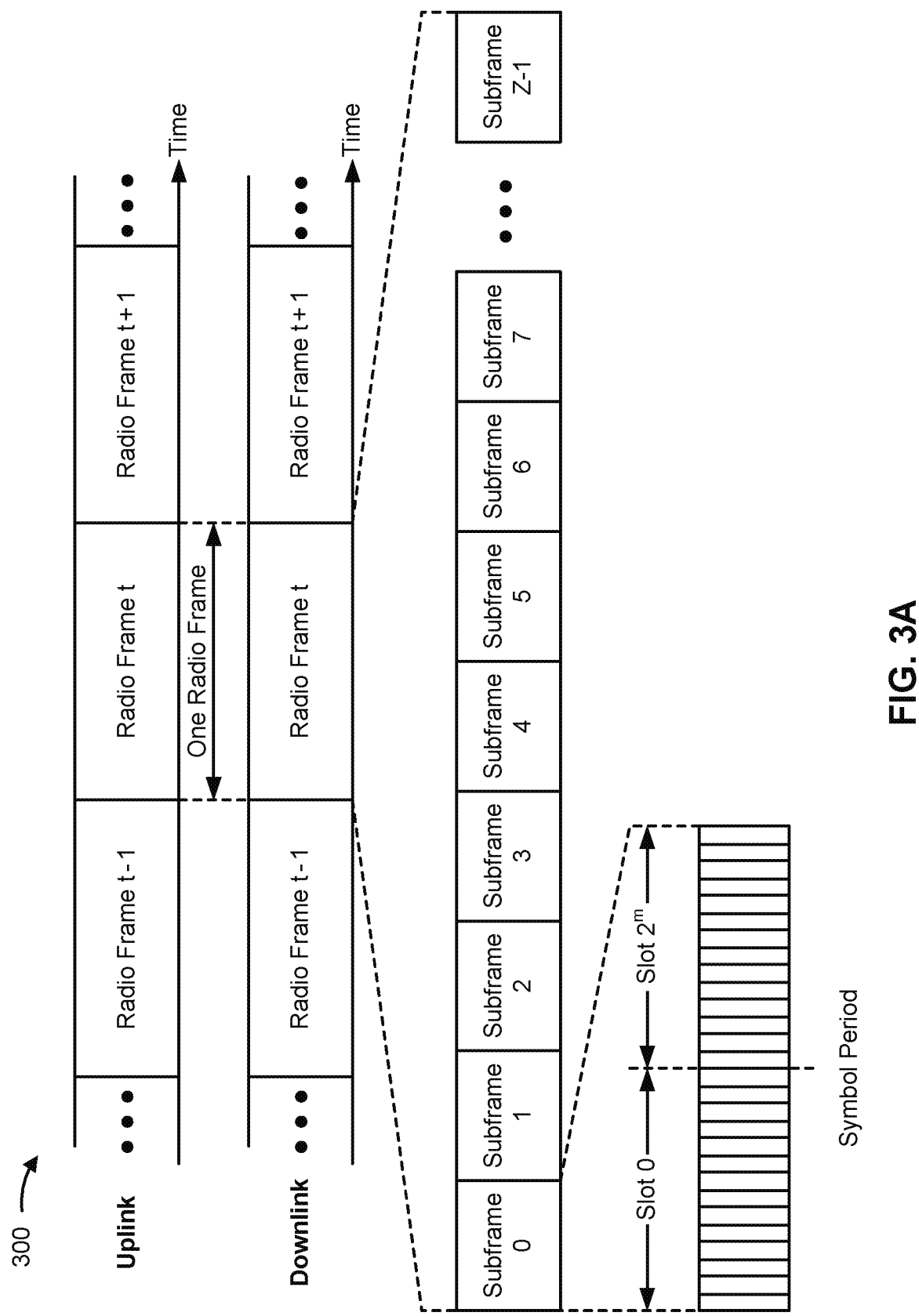
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
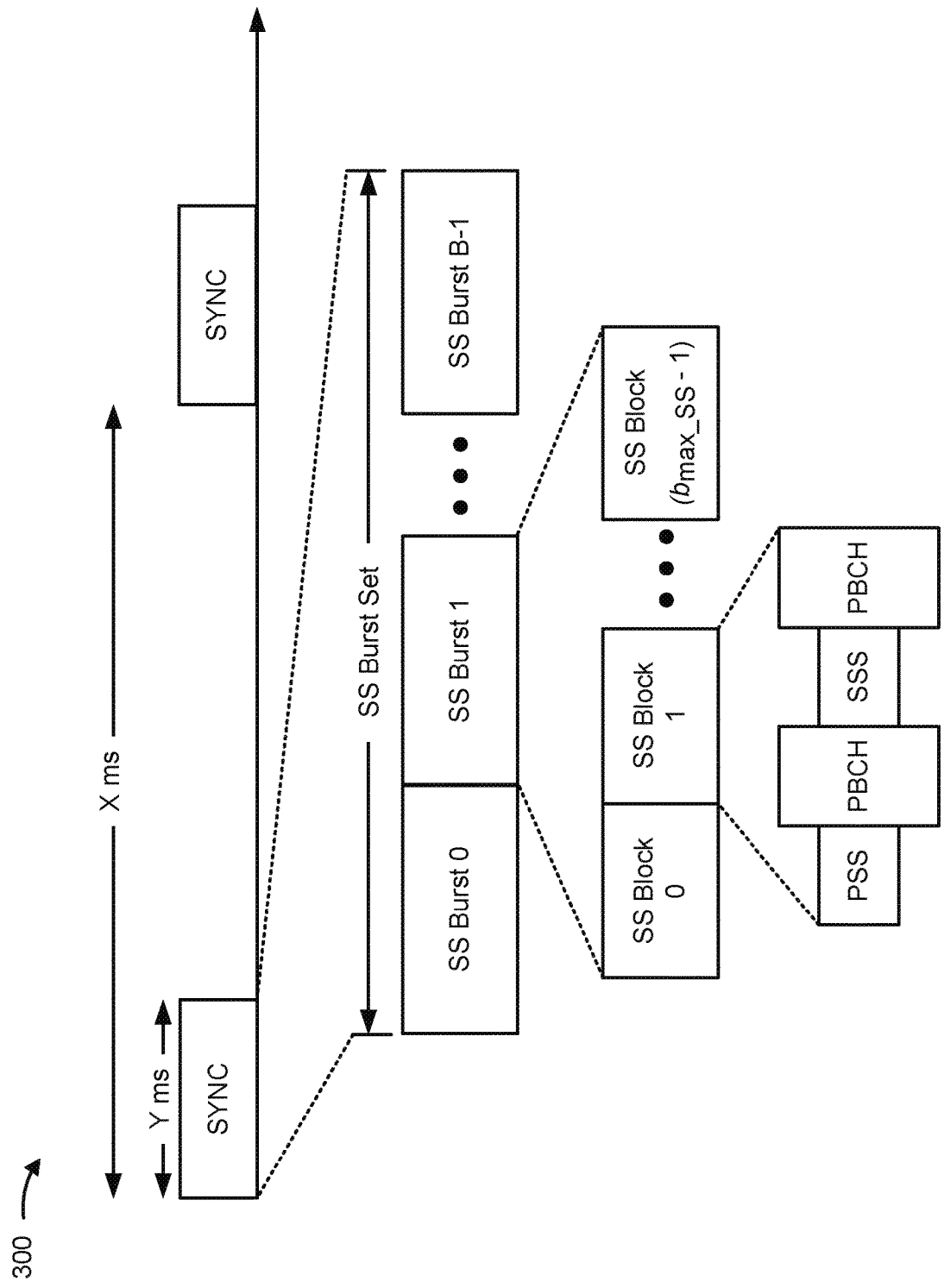
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
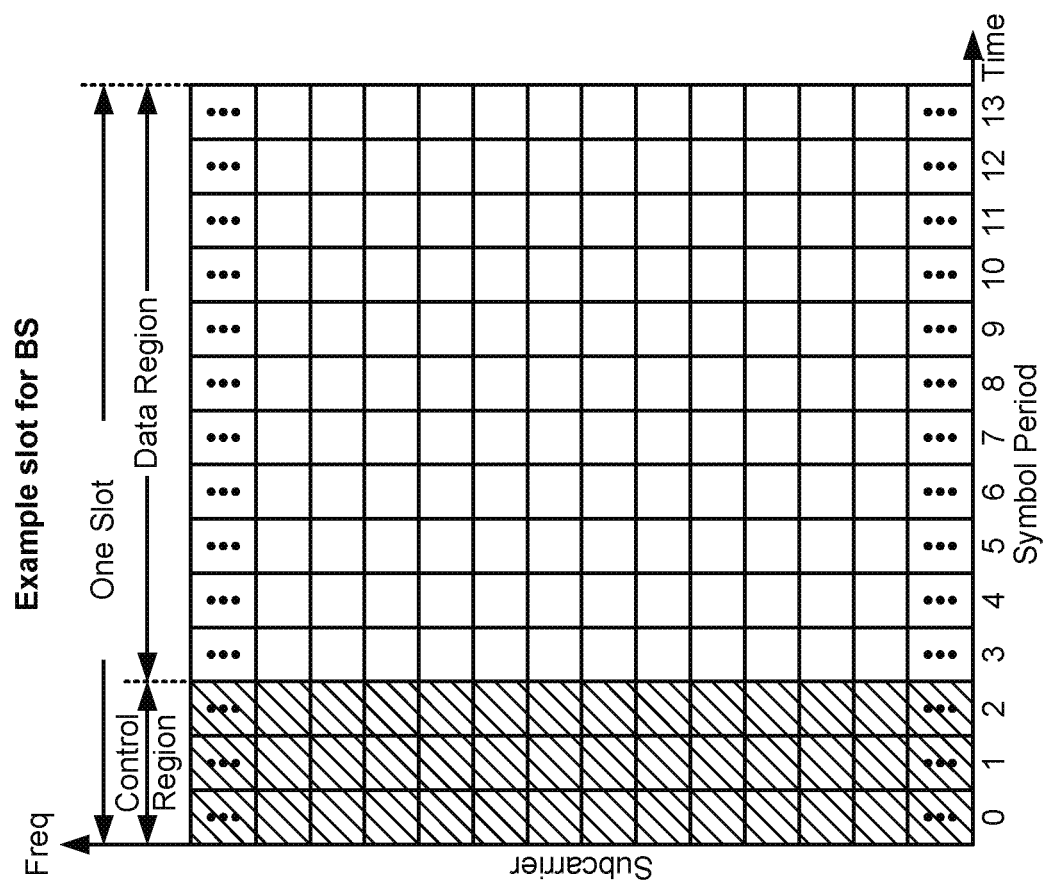
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

A UE and a BS may perform wireless communication in a wireless network. To facilitate bandwidth selection and parameters for the wireless communication link between the UE and the BS, a UE may transmit an SRS to the BS. The BS may perform one or more measurements of the SRS (which may be referred to as a channel estimation) and may select the bandwidth and/or other parameters for the wireless communication link based at least in part on the results of the one or more measurements. In some cases, a UE may support full reciprocity, in which case the UE is configured and/or equipped with an equal quantity of transmit elements (e.g., antennas, antenna arrays, antenna panels, and/or the like) and receive elements. In this case, the BS may use the result of an uplink channel estimation for downlink channel estimation due to the equality between the transmit elements and receive elements of the UE. However, if a UE is configured and/or equipped with an unequal quantity of transmit elements and receive elements (which may be referred to as partial reciprocity), the BS may be unable to estimate the downlink based at least in part on full reciprocity with the uplink.

Some techniques and apparatuses described herein provide CSI acquisition for partial reciprocity. A UE that may not support full reciprocity (e.g., a UE that is configured and/or equipped with a greater quantity of receive elements relative to a quantity of transmit elements) may transmit an SRS to a BS. The BS may transmit, to the UE, a first CSR-RS set and a second CSI-RS set. Transmissions of the first CSI-RS set may be precoded based at least in part on the SRS. Transmissions of the second CSI-RS set may be non-precoded and/or may be precoded using a precoder that is orthogonal to a precoder that is used to precode the transmissions of the first CSI-RS set. The UE may generate a CSI report that is based at least in part on the first CSI-RS set and the second CSI-RS set. The CSI report may indicate various joint and/or individual channel estimation parameters, such as a joint and/or individual precoder matrix indicators (PMIs), joint and/or individual rank indicators (RIs), joint and/or individual channel quality indicators (CQIs), joint and/or individual CSI-RS resource indicators (CRIs), and/or the like. In this way, the joint and/or individual channel estimation parameters that are determined from a combination of a precoded CSI-RS set (e.g., based at least in part on an SRS transmitted from the UE) and precoded and/or non-precoded CSI-RS set increases the accuracy and performance of the CSI report and reduces the payload of the CSI report, and may be used by the BS to improve downlink channel quality for partial reciprocity.

FIGS. 5A-5E are diagrams illustrating examples 500 of CSI acquisition for partial reciprocity, in accordance with various aspects of the present disclosure. As shown in FIGS. 5A-5E, examples 500 may include communication between a BS (e.g., BS 110) and a UE (e.g., UE 120). In some aspects, the BS and the UE may be included in a wireless network (e.g., wireless network 100). In some aspects, the BS and the UE may communicate using a frame structure (e.g., frame structure 300 illustrated in FIG. 3A and/or another frame structure), a slot format (e.g., slot format 410 illustrated in FIG. 4 and/or another slot format), and/or the like.

In some aspects, the UE may be configured and/or equipped with an unequal quantity of transmit elements and receive elements (e.g., a greater quantity of receive elements relative to the quantity of transmit elements). In this case, the BS may be unable to estimate the downlink of the wireless communication link using full reciprocity channel estimation techniques.

Figure 5A:
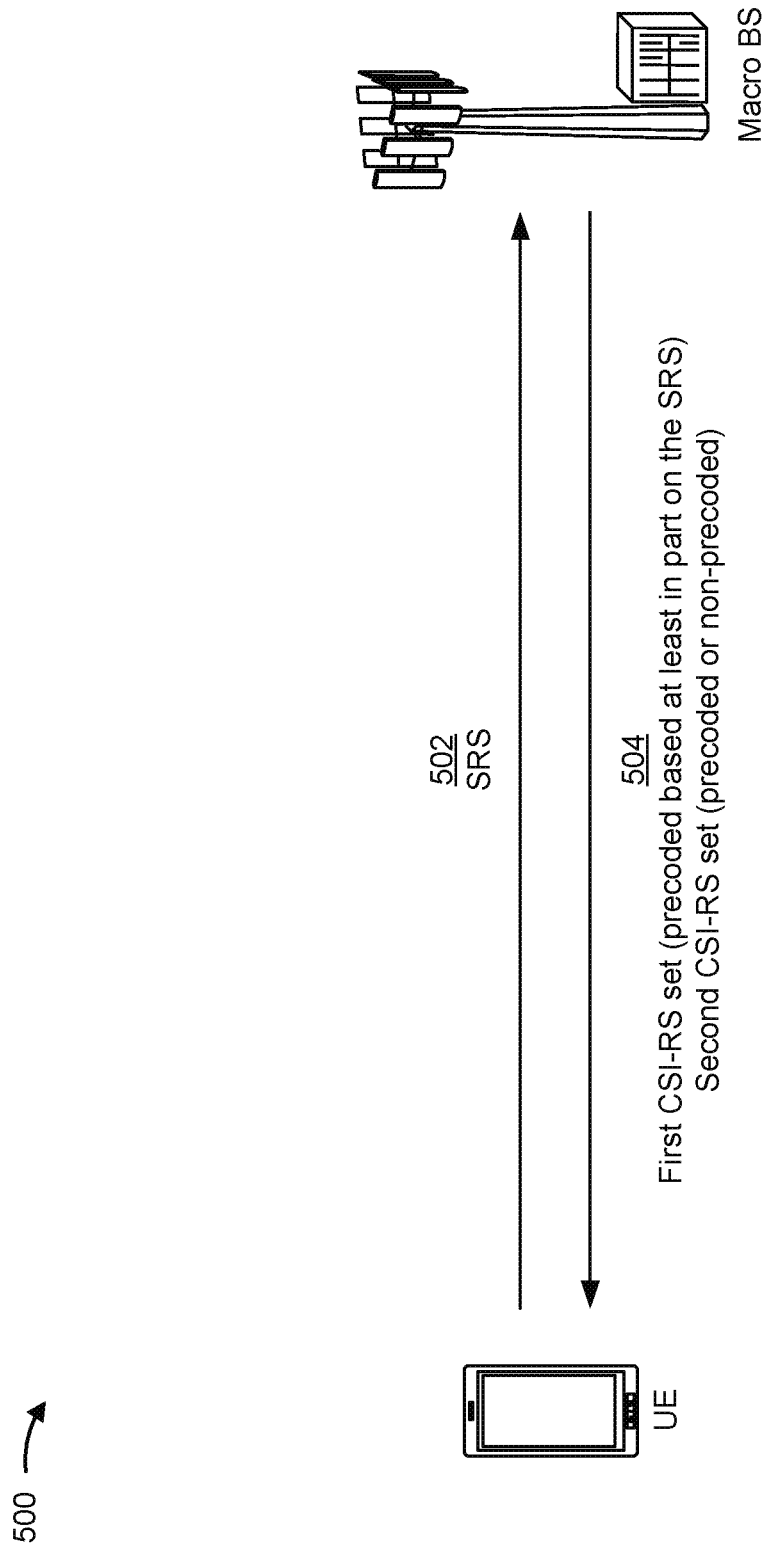
FIGS. 5A-5E are diagrams illustrating examples of channel state information (CSI) acquisition for partial reciprocity, in accordance with various aspects of the present disclosure.

As shown in FIG. 5A, and by reference number 502, in order to assist the BS in fully estimating the downlink, the UE may transmit an SRS to the BS. The SRS may include a reference signal (e.g., that is based at least in part on a Zadoff Chu sequence and/or another type of sequence) that the UE transmits on the uplink of the wireless communication link. In some aspects, the UE may transmit a plurality of SRSs to the BS, where each SRS is transmitted from a respective transmit element of the UE.

In some aspects, the SRS may indicate to the BS that the UE supports partial reciprocity. For example, the SRS may indicate that the UE is configured and/or equipped with a particular quantity of transmit elements, may indicate that the UE is configured and/or equipped with a particular quantity of receive elements that is greater relative to the quantity of transmit elements, may indicate that the UE supports partial reciprocity, and/or the like. Additionally and/or alternatively, the indication that the UE supports partial reciprocity may be indicated in other communications with the BS, such as during a random access channel (RACH) procedure, UE uplink signaling, and/or the like.

As further shown in FIG. 5A, and by reference number 504, the BS may transmit a plurality of CSI-RS sets to the UE based at least in part on receiving the SRS and/or the indication that the UE supports partial reciprocity. The plurality of CSI-RS sets may include, for example, a first CSI RS set and a second CSI-RS set. The first CSI-RS set and the second CSI-RS set may each include one or more CSI-RS transmissions. A CSI-RS may include a reference signal (e.g., a downlink reference signal) that is generated based at least in part on a sequence (e.g., a Zadoff Chu sequence, a Gold sequence, and/or the like). The UE may perform one or more measurements associated with a CSI-RS, and may generate a CSI report that indicates results of the one or more measurements and/or that indicates one or more parameters that are based at least in part on the results of the one or more measurements.

In some aspects, the one or more CSI-RS transmissions, included in the first CSI-RS set, may be associated with respective CSI-RS ports that are associated with the SRS. For example, transmissions of the CSI-RS ports may be precoded based at least in part on the SRS. In some aspects, the one or more CSI-RS transmissions, included in the second CSI-RS set, may be associated with transmissions of respective CSI-RS ports that are non-precoded and/or are precoded using a precoder that is orthogonal to a precoder that is used to precode the transmissions of the first CSI-RS set (e.g., the transmissions of the second CSI-RS set are on a subspace of that is orthogonal to the subspace of the precoder used for the first CSI-RS set, which ensures the orthogonality of PMIs for the first CSI-RS set and the second CSI-RS set).

Figure 5B:
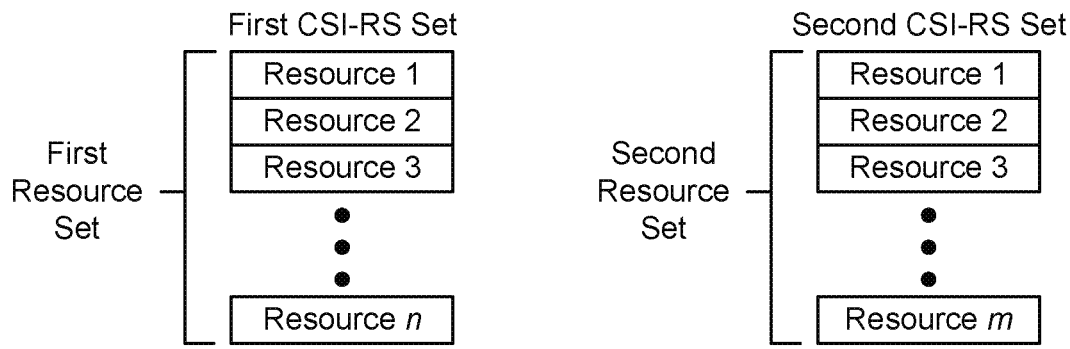
Figure 5B:
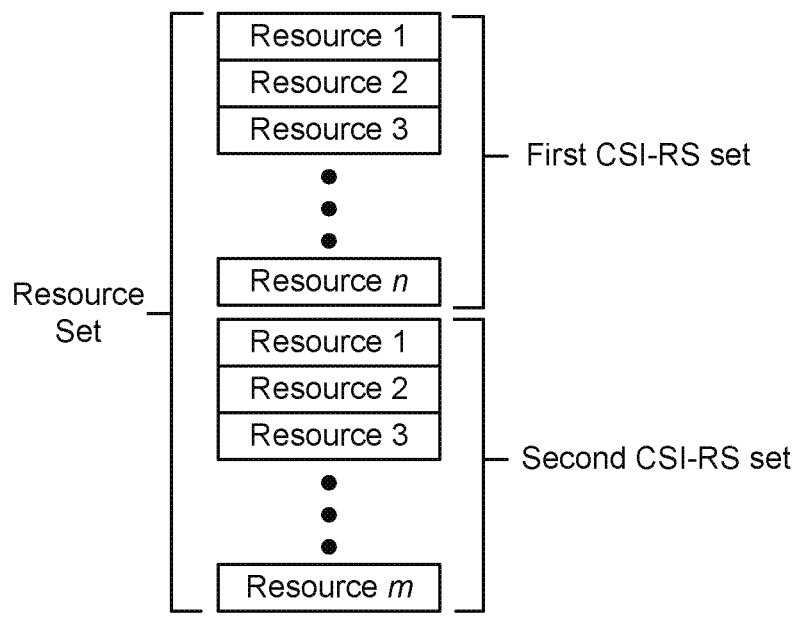
Figure 5B:
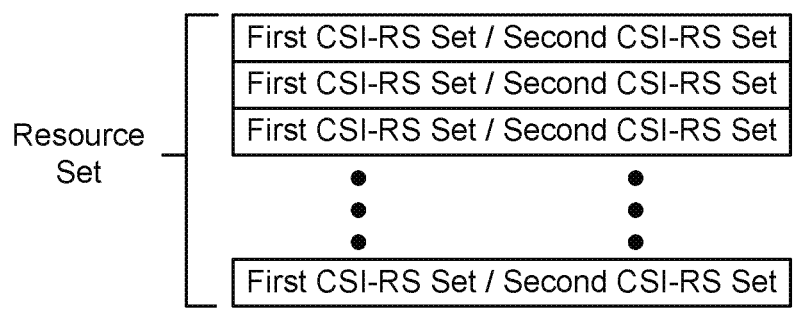
Figure 5C:
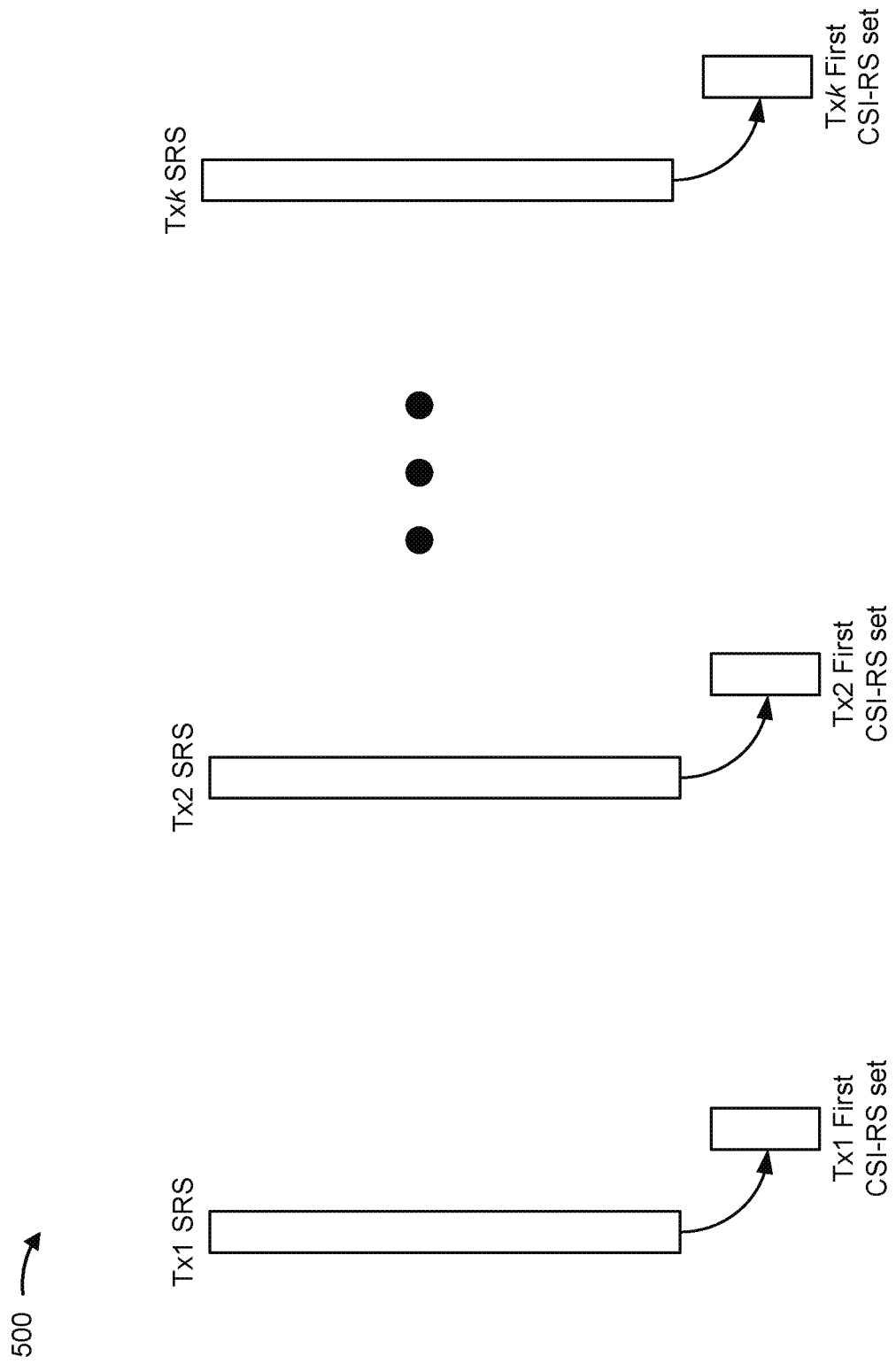

As shown in FIGS. 5B and 5C, the BS may configure the first CSI-RS set and/or the second CSI-RS set using various resource and/or transmission configurations. FIG. 5B illustrates various examples of resource set configurations for the first CSI-RS set and the second CSI-RS set. Other examples of resource set configurations may be used. As shown in Example 1, the BS may independently configure respective resource sets for the first CSI-RS set and the second CSI-RS set. In some aspects, the respective resource sets may be different and/or non-overlapping resource sets, may be partially overlapping resources, and/or the like. For example, the BS may configure a first resource set, for the first CSI-RS set, that includes time-domain and/or frequency-domain resources 1-n, and a second resource set, for the second CSI-RS set, that includes a different set of time-domain and/or frequency-domain resources 1-m.

As shown in Example 2, the BS may jointly configure a resource set for the first CSI-RS set and the second CSI-RS set. In this case, the resource set may include different and/or non-overlapping resource subsets (e.g., time-domain and/or frequency-domain resource subsets) for the first CSI-RS set and the second CSI-RS set, may include partially overlapping resource subsets, and/or the like. As shown in Example 3, the BS may jointly configure a resource set for the first CSI-RS set and the second CSI-RS set, in which the first CSI-RS set and the second CSI-RS set share the same CSI resources (e.g., the same time-domain and/or frequency-domain resources)

FIG. 5C illustrates an example configuration for SRS transmit switching for the first CSI-RS set. Other examples for SRS transmit switching configurations may be used. As indicated above, in some aspects, the UE may be configured to transmit an SRS across a plurality of transmit elements. This may be referred to as SRS transmit switching. In this case, the BS may configure the first CSI-RS set based at least in part on whether the UE implements SRS transmit switching. In some aspects, the BS may configure the bandwidth, periodicity, and/or the like of the first CSI-RS set based at least in part on which transmit element is used to transmit the SRS. For example, and as shown in FIG. 5C, the BS may configure the bandwidth, periodicity, and/or the like of the first CSI-RS set based at least in part on whether the UE transmits the SRS from Tx1, Tx2, Txk, and/or the like.

Figure 5D:
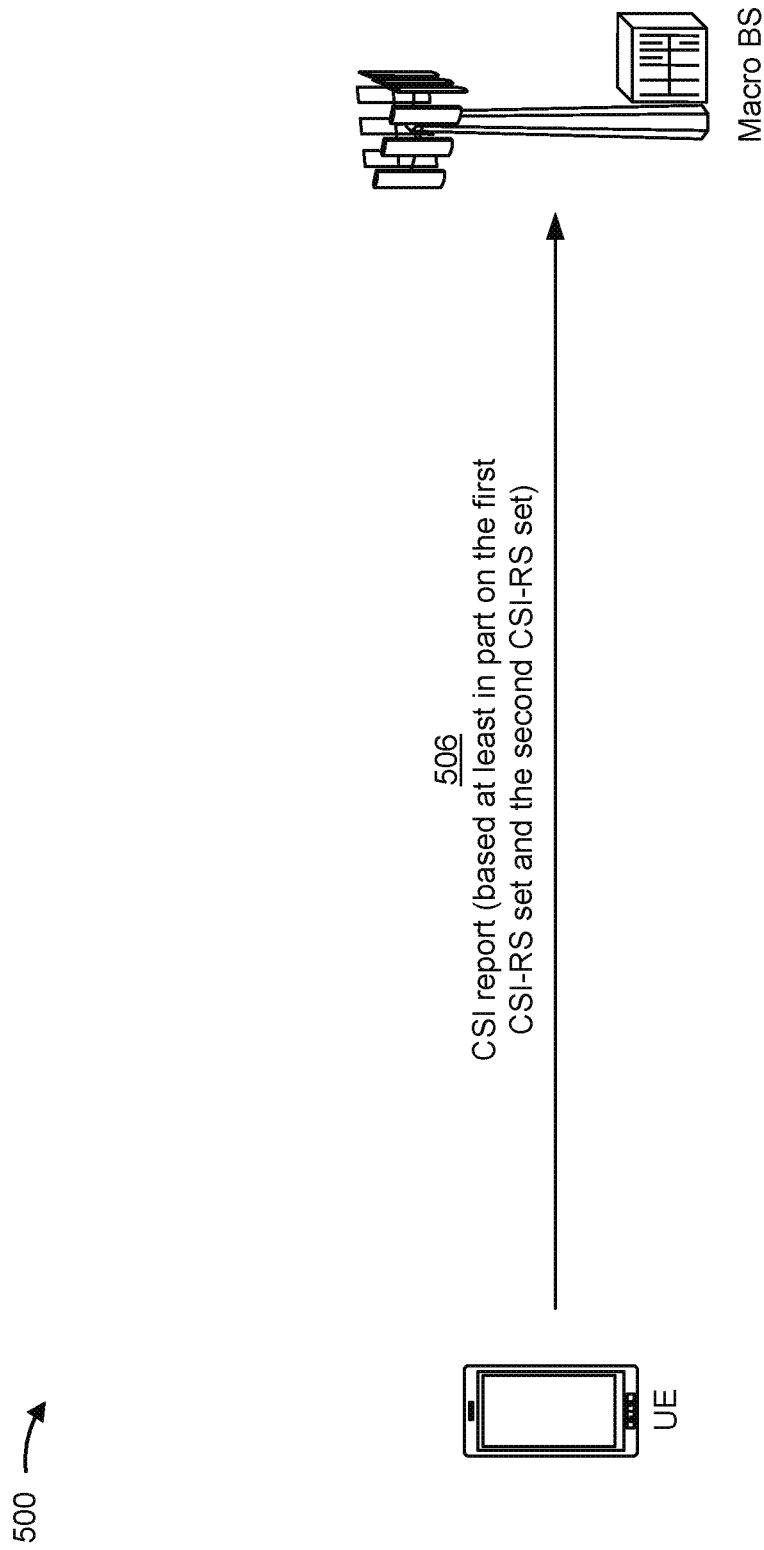

As shown in FIG. 5D, and by reference number 506, the UE may generate and transmit, to the BS, a CSI report that is based at least in part on the first CSI-RS set and the second CSI-RS set. In some aspects, the UE may transmit the CSI report in an uplink control information (UCI) communication and/or another type of communication on the uplink. In some aspects, the UE may generate and transmit the CSI report based at least in part on a CSI report configuration. The CSI report configuration may indicate one or more parameters for generating the CSI report. In some aspects, the BS may transmit the CSI report configuration to the UE, and the UE may receive the CSI report configuration from the BS. In some aspects, the UE may receive the CSI report configuration from another BS, may be hardcoded with the CSI report configuration, and/or the like. In some aspects, the UE may receive the CSI report configuration in a radio resource control (RRC) communication, a downlink control information (DCI) communication, a medium access control (MAC) control element (MAC-CE) communication, a system information communication (e.g., a physical broadcast channel (PBCH) communication, a system information block (SIB), a remaining minimum system information (RMSI) communication, an other system information (OSI) communication, and/or the like), and/or the like.

In some aspects, the one or more parameters may include a parameter that indicates and/or specifies a resource set configuration for the first CSI-RS set and/or the second CSI-RS set. For example, the parameter may indicate and/or specify an example resource set configuration illustrated in FIG. 5B and/or another resource set configuration. In this case, the UE may generate the CSI report based at least in part on the resource set configuration for the first CSI-RS set and/or the second CSI-RS set.

In some aspects, the one or more parameters for generating the CSI report may include a parameter that indicates and/or specifies whether the UE is to include, in the CSI report, a first PMI associated with the first CIS-RS set, a second PMI associated with the second CSI-RS set, and/or a joint PMI associated with the first CSI-RS set and the second CSI-RS set. A PMI may be associated with a precoder matrix, selected from a codebook, that corresponds to a beam or combination of beams requested by the UE. Moreover, the one or more parameters may include a parameter that indicates and/or specifies a codebook type associated with the first CSI-RS set and/or a codebook type associated with the second CSI-RS set. For example, the codebook type for each CSI-RS set may be selected from various types of codebooks, such as an NR Type-I codebook an NR Type-II codebook (e.g., a codebook that permits higher-resolution beam selection reporting relative to an NR Type-I codebook), and/or the like. Accordingly, the UE may select the first PMI for the first CSI-RS set from the codebook associated with the first CSI-RS set, may select the second PMI for the second CSI-RS set from the codebook associated with the second CSI-RS set, and/or may select the joint PMI from either codebook.

In some aspects, the one or more parameters may include a parameter for determining the first PMI, the second PMI, and/or the joint PMI. For example, the parameter may indicate and/or specify that the UE is to determine or identify the first PMI as a matrix that is sized based at least in part on a quantity of layers associated with the first CSI-RS set and a quantity of CSI-RS ports associated with the first CSI-RS set (e.g., a matrix that is sized according to p×r, where r corresponds to the quantity of layers and p corresponds to the quantity of CSI-RS ports). As another example, the parameter may indicate and/or specify that the UE is to determine or identify the second PMI as a matrix that is sized based at least in part on a quantity of layers associated with the second CSI-RS set and a quantity of CSI-RS ports associated with the second CSI-RS set (e.g., a matrix that is sized according to q×s, where s corresponds to the quantity of layers and q corresponds to the quantity of CSI-RS ports). As another example, the parameter may indicate and/or specify that the UE is to determine the joint PMI based at least in part on the first PMI and the second PMI. For example, the UE may determine or identify the joint PMI based at least in part on $$W = \begin{bmatrix} W_p & \\ & W_q \end{bmatrix}$$

where W corresponds to the joint PMI having R columns (layers) (e.g., R=r+s), $W_p$ corresponds to the first PMI, and $W_q$ corresponds to the second PMI.

In some aspects, the one or more parameters may include a parameter that indicates and/or specifies whether the UE is to include, in the CSI report, a first rank indicator (RI) (e.g., an indicator for a quantity of layers requested by the UE) associated with the first CSI-RS set and determined based at least in part on the first PMI (e.g., based at least in part on the total quantity of layers associated with the first PMI), a second RI associated with the second CSI-RS set and determined based at least in part on the second PMI (e.g., based at least in part on the total quantity of layers associated with the second PMI), and/or a joint RI that is determined based at least in part on the joint PMI (e.g., which may be based at least in part on the total quantity of layers associated with the first PMI and the total quantity of layers associated with the second PMI). In some aspects, the one or more parameters may include a parameter that indicates and/or specifies a maximum and/or minimum rank for the first RI, the second RI, and/or the joint RI. In some aspects, the one or more parameters may include a parameter that indicates and/or specifies the first RI (e.g., if the first RI is to be a fixed value corresponding to the quantity of CSI-RS ports associated with the first CSI-RS set). In this case, the UE may omit the indication of the first RI from the CSI report to reduce the overhead of the CSI report.

In some aspects, the one or more parameters may include a parameter that indicates and/or specifies whether the UE is to include, in the CSI report, a first channel quality indicator (CQI) (e.g., a value that indicates a channel quality of the downlink) associated with the first CSI-RS set and the first PMI, a second CQI associated with the second CSI-RS set and the second PMI, and/or a joint CQI that associated with the joint PMI (e.g., which may be based at least in part on the first PMI and the second PMI). In some aspects, the UE may determine the first CQI, the second CQI, and/or the joint CQI based at least in part on performing one or more channel quality measurements, such as a signal-to-noise-plus-interference ratio (SINR) measurement, a reference signal received quality (RSRQ) measurement, a reference signal received power (RSRP) measurement, and/or the like.

In some aspects, the one or more parameters may include a parameter that indicates and/or specifies whether the UE is to include, in the CSI report, a first CSI-RS resource indicator (CRI) (e.g., an indicator of a set of time-domain resources and/or frequency-domain resources) associated with the first CSI-RS set and the first PMI, a second CRI associated with the second CSI-RS set and the second PMI, and/or a joint CRI that associated with the joint PMI (e.g., which may be based at least in part on the first PMI and the second PMI), the first CSI-RS set, and/or the second CSI-RS set. In some aspects, the first CRI may indicate and/or specify a resource selection from the resource set or resource subset configured for the first CSI-RS set. In some aspects, the second CRI may indicate and/or specify a resource selection from the resource set or resource subset configured for the second CSI-RS set. In some aspects, the joint CRI may indicate and/or specify a resource selection from the resource set or resource subset configured for the first CSI-RS set and/or the resource set or resource subset configured for the second CSI-RS set. In this case, the joint CRI may indicate a first value (e.g., CRI=0) to indicate a selection of a CSI resource from the resource set or resource subset configured for the first CSI-RS set, may indicate a second value (e.g., CRI=1) to indicate a selection of a CSI resource from the resource set or resource subset configured for the second CSI-RS set, may indicate a third value (e.g., CRI=2) to indicate a selection of a CSI resource from the resource set or resource subset configured for the first CSI-RS set and from the resource set or resource subset configured for the second CSI-RS set.

In some aspects, the one or more parameters may include a parameter that specifies whether the UE is to transmit a CSI report only for an overlapping bandwidth region between the first CSI-RS set and the second CSI-RS set, or whether the UE is to transmit a CSI report for the overlapping bandwidth region and for non-overlapping bandwidth regions for the first CSI-RS set and the second CSI-RS set.

Figure 5E:
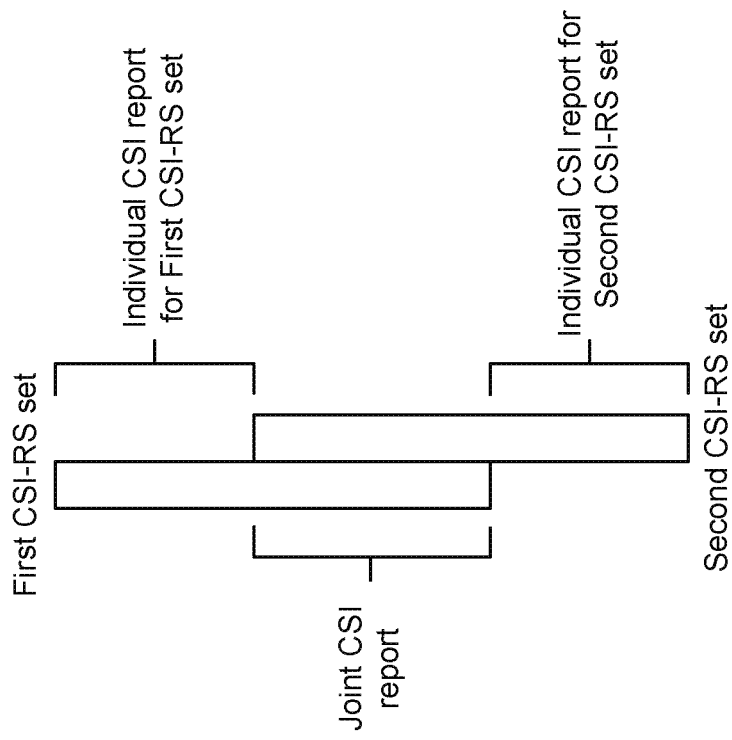
Figure 5E:
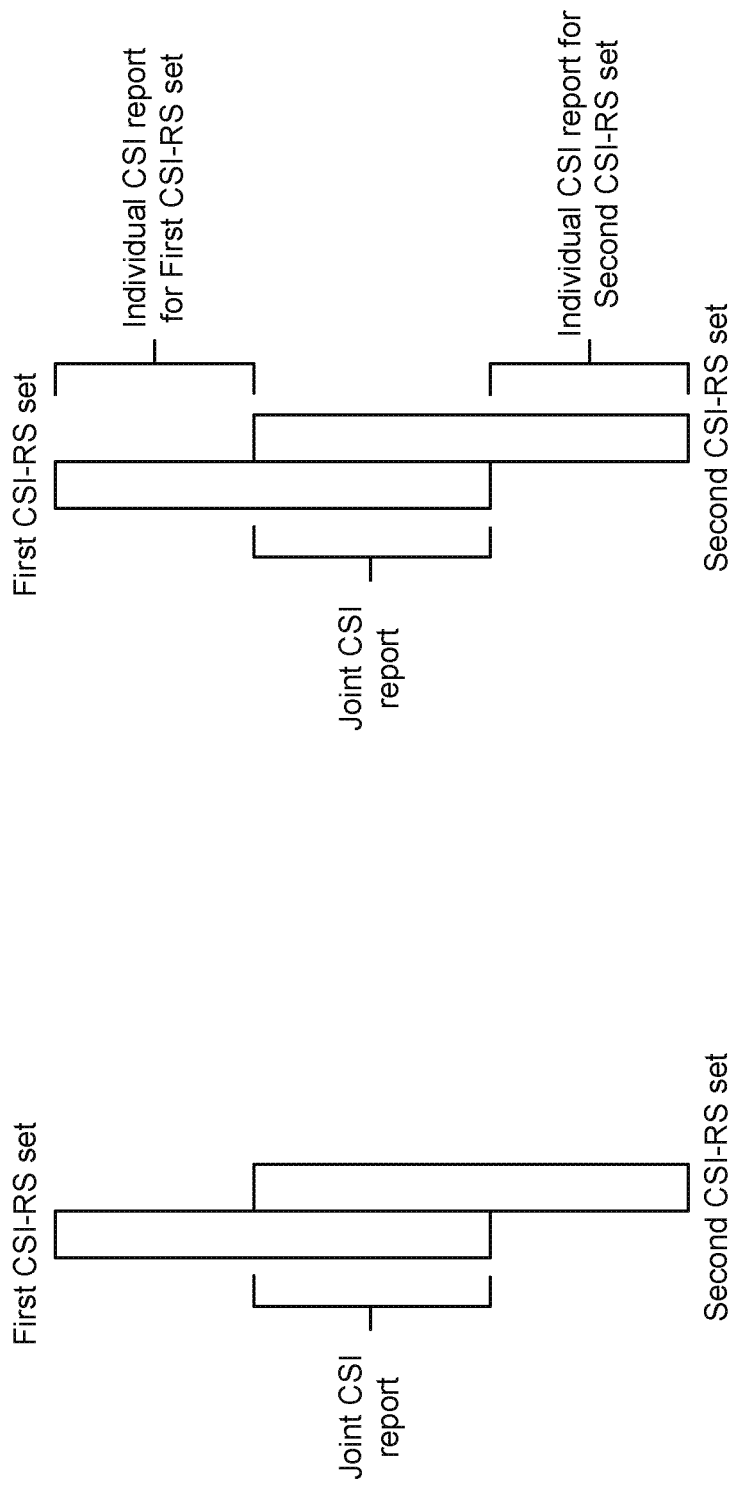

FIG. 5E illustrates example configurations for generating and transmitting CSI reports for overlapping CSI-RS sets. Other example configurations may be used. As shown in Example 1, the CSI report configuration may indicate and/or specify that the UE is to generate and transmit a CSI report that includes only a joint CSI report for an overlapping region associated with the first CSI-RS set and the second CSI-RS set. The overlapping region may include a region in the bandwidth of the first CSI-RS set and the bandwidth of the second CSI-RS set that at least partially overlap. As shown in Example 2, the CSI report configuration may indicate and/or specify that the UE is to generate and transmit a CSI report that includes a joint CSI report for an overlapping region associated with the first CSI-RS set and the second CSI-RS set, as well as individual CSI reports for the non-overlapping regions of the first CSI-RS set and the second CSI-RS set. In this case, the joint CSI report may include an indication of a joint PMI, a joint RI, a joint CQI, and/or a joint CRI associated with the first CSI-RS set and the second CSI-RS set, the individual CSI report associated with the first CSI-RS set may include an indication of a PMI, an RI, a CQI, and/or a CRI associated with the first CSI-RS set, the individual CSI report associated with the second CSI-RS set may include an indication of a PMI, an RI, a CQI, and/or a CRI associated with the second CSI-RS set, and/or the like.

In this way, a UE that may not support full reciprocity (e.g., a UE that is configured and/or equipped with a greater quantity of receive elements relative to a quantity of transmit elements) may transmit an SRS to a BS. The BS may transmit, to the UE, a first CSR-RS set and a second CSI-RS set. Transmissions of the first CSI-RS set may be precoded based at least in part on the SRS, and transmissions of the second CSI-RS set may be non-precoded and/or precoded. The UE may generate a CSI report that is based at least in part on the first CSI-RS set and the second CSI-RS set. The CSI report may indicate various joint and/or individual channel estimation parameters, such as a joint and/or individual PMIs, joint and/or individual RIs, joint and/or individual CQIs, joint and/or individual CRIs, and/or the like. In this way, the joint and/or individual channel estimation parameters that are determined from a combination of a precoded CSI-RS set (e.g., based at least in part on an SRS transmitted from the UE) and a non-precoded and/or precoded CSI-RS set increases the accuracy and performance of the CSI report and reduces the payload of the CSI report, and may be used by the BS to improve downlink channel quality for partial reciprocity. For example, the BS may select beams, layers, streams, bandwidth allocation, transport block size, and/or other parameters for the downlink and/or the uplink of the wireless communication link based at least in part on the information indicated in the CSI report.

As indicated above, FIGS. 5A-5E are provided as examples. Other examples may differ from what is described with respect to FIGS. 5A-5E.

Figure 6:
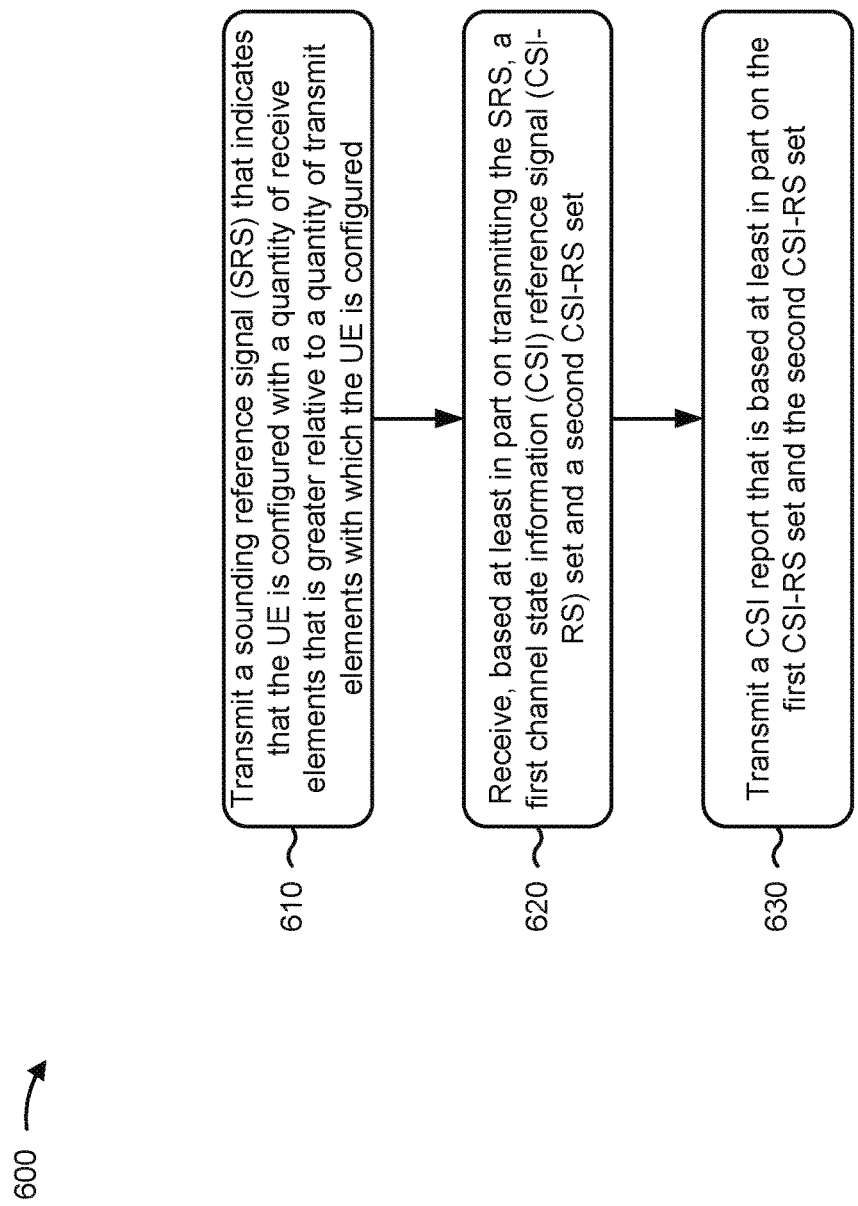
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with CSI acquisition for partial reciprocity.

As shown in FIG. 6, in some aspects, process 600 may include transmitting an SRS that indicates that the UE is configured with a quantity of receive elements that is greater relative to a quantity of transmit elements with which the UE is configured (block 610). For example, the UE (e.g., using receive processor 258, transmit processor 264, controller/processor 280, memory 282, and/or the like) may transmit an SRS that indicates that the UE is configured with a quantity of receive elements that is greater relative to a quantity of transmit elements with which the UE is configured, as described above.

As further shown in FIG. 6, in some aspects, process 600 may include receiving, based at least in part on transmitting the SRS, a first CSI-RS set and a second CSI-RS set (block 620). For example, the UE (e.g., using receive processor 258, transmit processor 264, controller/processor 280, memory 282, and/or the like) may receive, based at least in part on transmitting the SRS, a first CSI-RS set and a second CSI-RS set, as described above.

As further shown in FIG. 6, in some aspects, process 600 may include transmitting a CSI report that is based at least in part on the first CSI-RS set and the second CSI-RS set (block 630). For example, the UE (e.g., using receive processor 258, transmit processor 264, controller/processor 280, memory 282, and/or the like) may transmit a CSI report that is based at least in part on the first CSI-RS set and the second CSI-RS set, as described above.

Process 600 may include additional aspects, such as any single aspect or any combination of aspects described below and/or in connection with one or more other processes described elsewhere herein.

In a first aspect, the first CSI-RS set is based at least in part on the SRS. In a second aspect, alone or in combination with the first aspect, the first CSI-RS includes one or more CSI-RS ports associated with the SRS. In a third aspect, alone or in combination with one or more of the first and second aspects, transmissions of the first CSI-RS set are precoded based at least in part on the SRS. In a fourth aspect, alone or in combination with one or more of the first through third aspects, transmissions of the second CSI-RS set are non-precoded or are precoded using a precoder that is orthogonal to a precoder that is used to precode the transmissions of the first CSI-RS set. In a fifth aspect, alone or in combination with one or more of the first through fourth aspects, process 600 further comprises generating the CSI report based at least in part on the first CSI-RS set and the second CSI-RS set. In a sixth aspect, alone or in combination with one or more of the first through fifth aspects, process 600 further comprises receiving an indication of a CSI report configuration, and generating the CSI report comprises generating the CSI report based at least in part on the CSI report configuration.

In a seventh aspect, alone or in combination with one or more of the first through sixth aspects, the CSI report configuration indicates one or more parameters for the CSI report, and the one or more parameters comprise at least one of a parameter that specifies maximum rank for a joint RI associated with the first CSI-RS set and the second CSI-RS set, a parameter that specifies a maximum rank for a first RI associated with the first CSI-RS set, a parameter that specifies a minimum rank for the first RI, a parameter that specifies the first RI, a parameter that specifies a maximum rank for a second RI associated with the second CSI-RS set, a parameter that specifies a first codebook type for the first CSI-RS set, or a parameter that specifies a second codebook type for the second CSI-RS set. In an eighth aspect, alone or in combination with one or more of the first through seventh aspects, the CSI report indicates at least one of a first PMI associated with the first CSI-RS set, a second PMI associated with the second CSI-RS set, a joint PMI associated with the first CSI-RS set and the second CSI-RS set, a first RI associated with the first PMI, a second RI associated with the second PMI, a joint RI associated with the joint PMI, a CQI associated with the first PMI and the second PMI, a first CRI associated with the first PMI, a second CRI associated with the second PMI, or a joint CRI associated with the joint PMI.

In a ninth aspect, alone or in combination with one or more of the first through eighth aspects, the CSI report comprises a first PMI for the first CSI-RS set and a second PMI for the second CSI-RS set, and process 600 further comprises identifying the first PMI based at least in part on a first quantity of CSI-RS ports associated with the first CSI-RS set and a first quantity of layers associated with the first CSI-RS set and identifying the second PMI based at least in part on a second quantity of CSI-RS ports associated with the second CSI-RS set and a second quantity of layers associated with the second CSI-RS set. In a tenth aspect, alone or in combination with one or more of the first through ninth aspects, the first PMI and the second PMI are each configured with an NR Type-I codebook or an NR Type-II codebook.

In an eleventh aspect, alone or in combination with one or more of the first through tenth aspects, the CSI report comprises a joint RI for the first CSI-RS set and the second CSI-RS set, and process 600 further comprises determining the joint RI based at least in part on a first quantity of layers associated with a first precoder matrix indicator (PMI) associated with the first CSI-RS set and a second quantity of layers associated with a second PMI associated with the second CSI-RS set. In a twelfth aspect, alone or in combination with one or more of the first through eleventh aspects, the first CSI-RS set is configured with a first set of time-domain resources and frequency-domain resources, and the second CSI-RS set is configured with a second set of time-domain resources and frequency-domain resources that is different from the first set of time-domain resources and frequency-domain resources. In a thirteenth aspect, alone or in combination with one or more of the first through twelfth aspects, the CSI report comprises a joint CRI associated with the first CSI-RS set and the second CSI-RS set, and the joint CRI indicates the first set of time-domain resources and frequency-domain resources or the second set of time-domain resources and frequency-domain resources.

In a fourteenth aspect, alone or in combination with one or more of the first through thirteenth aspects, the first CSI-RS set is configured with a first subset of a set of time-domain resources and frequency-domain resources, and the second CSI-RS set is configured with a second subset, of the set of time-domain resources and frequency-domain resources, that is different from the first subset. In a fifteenth aspect, alone or in combination with one or more of the first through fourteenth aspects, the CSI report comprises a joint CRI associated with the first CSI-RS set and the second CSI-RS set, and the joint CRI indicates at least one of the first subset or the second subset. In a sixteenth aspect, alone or in combination with one or more of the first through fifteenth aspects, the first CSI-RS set and the second CSI-RS are included in a same CSI-RS resource. In a seventeenth aspect, alone or in combination with one or more of the first through sixteenth aspects, the CSI report comprises: a first CRI associated with the first CSI-RS set; and a second CRI associated with the second CSI-RS set.

In an eighteenth aspect, alone or in combination with one or more of the first through seventeenth aspects, a configuration for the first CSI-RS set is based at least in part on a configuration for the SRS, and the configuration for the SRS comprises at least one of a periodicity parameter associated with the SRS or a bandwidth parameter associated with the SRS. In a nineteenth aspect, alone or in combination with one or more of the first through eighteenth aspects, a first bandwidth of the first CSI-RS set and a second bandwidth of the second CSI-RS set partially overlap, and the CSI report is associated with a partial overlapping region of the first bandwidth and the second bandwidth. In a twentieth aspect, alone or in combination with one or more of the first through nineteenth aspects, a first bandwidth of the first CSI-RS set and a second bandwidth of the second CSI-RS set partially overlap, and the CSI report comprises a first CSI report, associated with a non-overlapping region of the first bandwidth, that includes a first precoding matrix indicator (PMI) associated with the first CSI-RS set, a second CSI report, associated with a non-overlapping region of the second bandwidth, that includes a second PMI associated with the second CSI-RS set, and a third CSI report, associated with a partial overlapping region of the first bandwidth and the second bandwidth, that includes a joint PMI associated with the first CSI-RS set and the second CSI-RS set.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
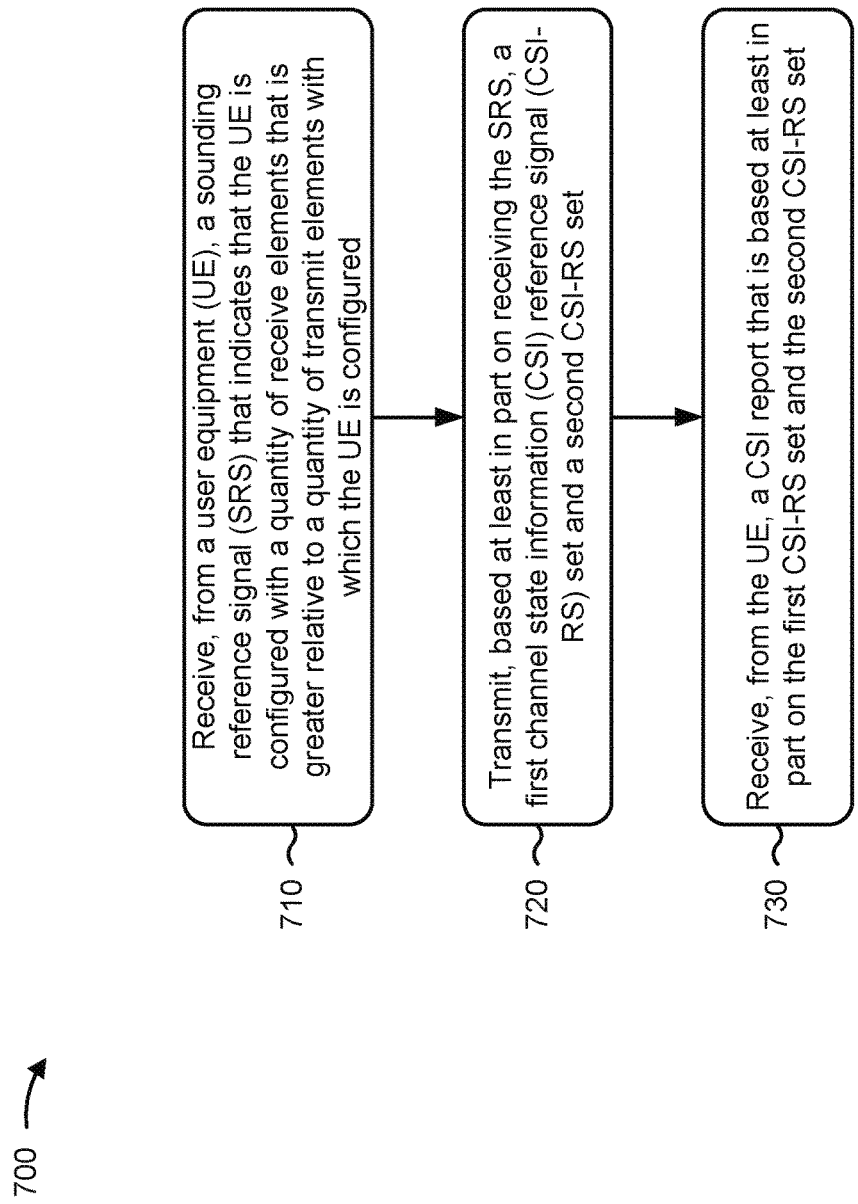
FIG. 7 is a diagram illustrating an example process performed, for example, by a base station (BS), in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with CSI acquisition for partial reciprocity.

As shown in FIG. 7, in some aspects, process 700 may include receiving, from a UE, an SRS that indicates that the UE is configured with a quantity of receive elements that is greater relative to a quantity of transmit elements with which the UE is configured (block 710). For example, the BS (e.g., using transmit processor 220, receive processor 238, controller/processor 240, memory 242, and/or the like) may receive, from a UE, an SRS that indicates that the UE is configured with a quantity of receive elements that is greater relative to a quantity of transmit elements with which the UE is configured, as described above.

As further shown in FIG. 7, in some aspects, process 700 may include transmitting, based at least in part on receiving the SRS, a first CSI-RS set and a second CSI-RS set (block 720). For example, the BS (e.g., using transmit processor 220, receive processor 238, controller/processor 240, memory 242, and/or the like) may transmit, based at least in part on receiving the SRS, a first CSI-RS set and a second CSI-RS set, as described above.

As further shown in FIG. 7, in some aspects, process 700 may include receiving, from the UE, a CSI report that is based at least in part on the first CSI-RS set and the second CSI-RS set (block 730). For example, the BS (e.g., using transmit processor 220, receive processor 238, controller/processor 240, memory 242, and/or the like) may receive, from the UE, a CSI report that is based at least in part on the first CSI-RS set and the second CSI-RS set, as described above.

Process 700 may include additional aspects, such as any single aspect or any combination of aspects described below and/or in connection with one or more other processes described elsewhere herein.

In a first aspect, the first CSI-RS set is based at least in part on the SRS. In a second aspect, alone or in combination with the first aspect, the first CSI-RS includes one or more CSI-RS ports associated with the SRS. In a third aspect, alone or in combination with one or more of the first and second aspects, process 700 further comprises precoding the first CSI-RS set based at least in part on the SRS. In a fourth aspect, alone or in combination with one or more of the first through third aspects, transmissions of the second CSI-RS set are non-precoded or are precoded using a precoder that is orthogonal to a precoder that is used to precode the transmissions of the first CSI-RS set. In a fifth aspect, alone or in combination with one or more of the first through fourth aspects, process 700 further comprises transmitting, to the UE, an indication of a CSI report configuration, and the CSI report is based at least in part on the CSI report configuration.

In a sixth aspect, alone or in combination with one or more of the first through fifth aspects, the CSI report configuration indicates one or more parameters for the CSI report, and the one or more parameters comprise at least one of: a parameter that specifies maximum rank for a joint RI associated with the first CSI-RS set and the second CSI-RS set, a parameter that specifies a maximum rank for a first RI associated with the first CSI-RS set, a parameter that specifies a minimum rank for the first RI, a parameter that specifies the first RI, a parameter that specifies a maximum rank for a second RI associated with the second CSI-RS set, a parameter that specifies a first codebook type for the first CSI-RS set, or a parameter that specifies a second codebook type for the second CSI-RS set. In a seventh aspect, alone or in combination with one or more of the first through sixth aspects, the CSI report indicates at least one of a first PMI associated with the first CSI-RS set, a second PMI associated with the second CSI-RS set, a joint PMI associated with the first CSI-RS set and the second CSI-RS set, a first RI associated with the first PMI, a second RI associated with the second PMI, a joint RI associated with the joint PMI, a CQI associated with the first PMI and the second PMI, a first CRI associated with the first PMI, a second CRI associated with the second PMI, or a joint CRI associated with the joint PMI.

In an eighth aspect, alone or in combination with one or more of the first through seventh aspects, the CSI report comprises a first PMI for the first CSI-RS set and a second PMI for the second CSI-RS set, and the first PMI and the second PMI are each configured with an NR Type-I codebook or an NR Type-II codebook. In a ninth aspect, alone or in combination with one or more of the first through eighth aspects, the CSI report comprises: a joint RI for the first CSI-RS set and the second CSI-RS set, and the joint RI is based at least in part on a first quantity of layers associated with a first PMI associated with the first CSI-RS set and a second quantity of layers associated with a second PMI associated with the second CSI-RS set. In a tenth aspect, alone or in combination with one or more of the first through ninth aspects, the first CSI-RS set is configured with a first set of time-domain resources and frequency-domain resources, and the second CSI-RS set is configured with a second set of time-domain resources and frequency-domain resources that is different from the first set of time-domain resources and frequency-domain resources.

In an eleventh aspect, alone or in combination with one or more of the first through tenth aspects, the CSI report comprises a joint CRI associated with the first CSI-RS set and the second CSI-RS set, the joint CRI indicates the first set of time-domain resources and frequency-domain resources or the second set of time-domain resources and frequency-domain resources In a twelfth aspect, alone or in combination with one or more of the first through eleventh aspects, the first CSI-RS set is configured with a first subset of a set of time-domain resources and frequency-domain resources, and the second CSI-RS set is configured with a second subset, of the set of time-domain resources and frequency-domain resources, that is different from the first subset. In a thirteenth aspect, alone or in combination with one or more of the first through twelfth aspects, the CSI report comprises a joint CRI associated with the first CSI-RS set and the second CSI-RS set, and the joint CRI indicates at least one of the first subset or the second subset.

In a fourteenth aspect, alone or in combination with one or more of the first through thirteenth aspects, the first CSI-RS set and the second CSI-RS are included in a same CSI-RS resource. In a fifteenth aspect, alone or in combination with one or more of the first through fourteenth aspects, the CSI report comprises a first CRI associated with the first CSI-RS set; and a second CRI associated with the second CSI-RS set. In a sixteenth aspect, alone or in combination with one or more of the first through fifteenth aspects, a configuration for the first CSI-RS set is based at least in part on a configuration for the SRS, and the configuration for the SRS comprises at least one of a periodicity parameter associated with the SRS or a bandwidth parameter associated with the SRS. In a seventeenth aspect, alone or in combination with one or more of the first through sixteenth aspects, a first bandwidth of the first CSI-RS set and a second bandwidth of the second CSI-RS set partially overlap, and the CSI report is associated with a partial overlapping region of the first bandwidth and the second bandwidth.

In an eighteenth aspect, alone or in combination with one or more of the first through seventeenth aspects, a first bandwidth of the first CSI-RS set and a second bandwidth of the second CSI-RS set partially overlap, and the CSI report comprises a first CSI report, associated with a non-overlapping region of the first bandwidth, that includes a first PMI associated with the first CSI-RS set, a second CSI report, associated with a non-overlapping region of the second bandwidth, that includes a second PMI associated with the second CSI-RS set, and a third CSI report, associated with a partial overlapping region of the first bandwidth and the second bandwidth, that includes a joint PMI associated with the first CSI-RS set and the second CSI-RS set.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

transmitting a sounding reference signal (SRS) that indicates that the UE is configured with a quantity of receive elements that is greater relative to a quantity of transmit elements with which the UE is configured;

receiving, based at least in part on transmitting the SRS, a first channel state information (CSI) reference signal (CSI-RS) set and a second CSI-RS set, wherein transmissions of the first CSI-RS set are precoded based at least in part on the SRS and wherein transmissions of the second CSI-RS set are non-precoded or are precoded using a precoder that is orthogonal to a precoder that is used to precode the transmissions of the first CSI-RS set; and transmitting a CSI report that is based at least in part on the first CSI-RS set and the second CSI-RS set.

2. The method of claim 1, wherein the first CSI-RS set is based at least in part on the SRS.

3. The method of claim 1, wherein the first CSI-RS includes one or more CSI-RS ports associated with the SRS.

4. The method of claim 1, further comprising:
generating the CSI report based at least in part on the first CSI-RS set and the second CSI-RS set.

5. The method of claim 4, further comprising:
receiving an indication of a CSI report configuration; and
wherein generating the CSI report comprises:
generating the CSI report based at least in part on the CSI report configuration.

6. The method of claim 5, wherein the CSI report configuration indicates one or more parameters for the CSI report,
wherein the one or more parameters comprise at least one of:
a parameter that specifies maximum rank for a joint rank indicator (RI) associated with the first CSI-RS set and the second CSI-RS set,
a parameter that specifies a maximum rank for a first RI associated with the first CSI-RS set,
a parameter that specifies a minimum rank for the first RI,
a parameter that specifies the first RI,
a parameter that specifies a maximum rank for a second RI associated with the second CSI-RS set,
a parameter that specifies a first codebook type for the first CSI-RS set, or
a parameter that specifies a second codebook type for the second CSI-RS set.

7. The method of claim 1, wherein the CSI report indicates at least one of:
a first precoder matrix indicator (PMI) associated with the first CSI-RS set,
a second PMI associated with the second CSI-RS set,
a joint PMI associated with the first CSI-RS set and the second CSI-RS set,
a first rank indicator (RI) associated with the first PMI,
a second RI associated with the second PMI,
a joint RI associated with the joint PMI,
a channel quality indicator (CQI) associated with the first PMI and the second PMI,
a first CSI-RS resource indicator (CRI) associated with the first PMI,
a second CRI associated with the second PMI, or
a joint CRI associated with the joint PMI.

8. The method of claim 1, wherein the CSI report comprises:
a first precoder matrix indicator (PMI) for the first CSI-RS set and a second PMI for the second CSI-RS set; and
wherein the method further comprises:
identifying the first PMI based at least in part on:
a first quantity of CSI-RS ports associated with the first CSI-RS set, and
a first quantity of layers associated with the first CSI-RS set; and identifying the second PMI based at least in part on:
a second quantity of CSI-RS ports associated with the second CSI-RS set, and
a second quantity of layers associated with the second CSI-RS set.

9. The method of claim 8, wherein the first PMI and the second PMI are each configured with a New Radio (NR) Type-I codebook or an NR Type-II codebook.

10. The method of claim 1, wherein the CSI report comprises:
a joint rank indicator (RI) for the first CSI-RS set and the second CSI-RS set; and
wherein the method further comprises:
determining the joint RI based at least in part on:
a first quantity of layers associated with a first precoder matrix indicator (PMI) associated with the first CSI-RS set, and
a second quantity of layers associated with a second PMI associated with the second CSI-RS set.

11. The method of claim 1, wherein the first CSI-RS set is configured with a first set of time-domain resources and frequency-domain resources; and
wherein the second CSI-RS set is configured with a second set of time-domain resources and frequency-domain resources that is different from the first set of time-domain resources and frequency-domain resources.

12. The method of claim 11, wherein the CSI report comprises:
a joint CSI-RS resource indicator (CRI) associated with the first CSI-RS set and the second CSI-RS set,
wherein the joint CRI indicates:
the first set of time-domain resources and frequency-domain resources, or
the second set of time-domain resources and frequency-domain resources.

13. The method of claim 1, wherein the first CSI-RS set is configured with a first subset of a set of time-domain resources and frequency-domain resources; and
wherein the second CSI-RS set is configured with a second subset, of the set of time-domain resources and frequency-domain resources, that is different from the first subset.

14. The method of claim 13, wherein the CSI report comprises:
a joint CSI-RS resource indicator (CRI) associated with the first CSI-RS set and the second CSI-RS set,
wherein the joint CRI indicates at least one of:
the first subset, or
the second subset.

15. The method of claim 1, wherein the first CSI-RS set and the second CSI-RS are included in a same CSI-RS resource.

16. The method of claim 1, wherein the CSI report comprises:
a first CSI-RS resource indicator (CRI) associated with the first CSI-RS set; and
a second CRI associated with the second CSI-RS set.

17. The method of claim 1, wherein a configuration for the first CSI-RS set is based at least in part on a configuration for the SRS; and wherein the configuration for the SRS comprises at least one of:
a periodicity parameter associated with the SRS, or
a bandwidth parameter associated with the SRS.

18. The method of claim 1, wherein a first bandwidth of the first CSI-RS set and a second bandwidth of the second CSI-RS set partially overlap; and
wherein the CSI report is associated with a partial overlapping region of the first bandwidth and the second bandwidth.

19. The method of claim 1, wherein a first bandwidth of the first CSI-RS set and a second bandwidth of the second CSI-RS set partially overlap; and
wherein the CSI report comprises:
a first CSI report, associated with a non-overlapping region of the first bandwidth, that includes a first precoding matrix indicator (PMI) associated with the first CSI-RS set,
a second CSI report, associated with a non-overlapping region of the second bandwidth, that includes a second PMI associated with the second CSI-RS set, and
a third CSI report, associated with a partial overlapping region of the first bandwidth and the second bandwidth, that includes a joint PMI associated with the first CSI-RS set and the second CSI-RS set.

20. A method of wireless communication performed by a base station (BS), comprising:
receiving, from a user equipment (UE), a sounding reference signal (SRS) that indicates that the UE is configured with a quantity of receive elements that is greater relative to a quantity of transmit elements with which the UE is configured;
transmitting, based at least in part on receiving the SRS, a first channel state information (CSI) reference signal (CSI-RS) set and a second CSI-RS set, wherein transmissions of the first CSI-RS set are precoded based at least in part on the SRS and wherein transmissions of the second CSI-RS set are non-precoded or are precoded using a precoder that is orthogonal to a precoder that is used to precode the transmissions of the first CSI-RS set; and
receiving, from the UE, a CSI report that is based at least in part on the first CSI-RS set and the second CSI-RS set.

21. The method of claim 20, wherein the first CSI-RS set is based at least in part on the SRS.

22. The method of claim 20, wherein the first CSI-RS includes one or more CSI-RS ports associated with the SRS.

23. The method of claim 20, further comprising:
transmitting, to the UE, an indication of a CSI report configuration,
wherein the CSI report is based at least in part on the CSI report configuration.

24. The method of claim 23, wherein the CSI report configuration indicates one or more parameters for the CSI report,
wherein the one or more parameters comprise at least one of:
a parameter that specifies maximum rank for a joint rank indicator (RI) associated with the first CSI-RS set and the second CSI-RS set,
a parameter that specifies a maximum rank for a first RI associated with the first CSI-RS set,
a parameter that specifies a minimum rank for the first RI,
a parameter that specifies the first RI,
a parameter that specifies a maximum rank for a second RI associated with the second CSI-RS set,
a parameter that specifies a first codebook type for the first CSI-RS set, or
a parameter that specifies a second codebook type for the second CSI-RS set, or wherein the CSI report indicates at least one of:
a first precoder matrix indicator (PMI) associated with the first CSI-RS set,
a second PMI associated with the second CSI-RS set,
a joint PMI associated with the first CSI-RS set and the second CSI-RS set,
a first rank indicator (RI) associated with the first PMI,
a second RI associated with the second PMI,
a joint RI associated with the joint PMI,
a channel quality indicator (CQI) associated with the first PMI and the second PMI,
a first CSI-RS resource indicator (CRI) associated with the first PMI,
a second CRI associated with the second PMI, or
a joint CRI associated with the joint PMI.

25. The method of claim 20, wherein the CSI report comprises:
a first precoder matrix indicator (PMI) for the first CSI-RS set and a second PMI for the second CSI-RS set,
wherein the first PMI and the second PMI are each configured with a New Radio (NR) Type-I codebook or an NR Type-II codebook, or
wherein the CSI report comprises:
a joint rank indicator (RI) for the first CSI-RS set and the second CSI-RS set,
wherein the joint RI is based at least in part on:
a first quantity of layers associated with a first precoder matrix indicator (PMI) associated with the first CSI-RS set, and
a second quantity of layers associated with a second PMI associated with the second CSI-RS set.

26. The method of claim 20, wherein the first CSI-RS set is configured with a first set of time-domain resources and frequency-domain resources;
wherein the second CSI-RS set is configured with a second set of time-domain resources and frequency-domain resources that is different from the first set of time-domain resources and frequency-domain resources; and
wherein the CSI report comprises:
a joint CSI-RS resource indicator (CRI) associated with the first CSI-RS set and the second CSI-RS set,
wherein the joint CRI indicates:
the first set of time-domain resources and frequency-domain resources, or
the second set of time-domain resources and frequency-domain resources.

27. The method of claim 20, wherein the first CSI-RS set is configured with a first subset of a set of time-domain resources and frequency-domain resources;
wherein the second CSI-RS set is configured with a second subset, of the set of time-domain resources and frequency-domain resources, that is different from the first subset; and
wherein the CSI report comprises:
a joint CSI-RS resource indicator (CRI) associated with the first CSI-RS set and the second CSI-RS set,
wherein the joint CRI indicates at least one of:
the first subset, or
the second subset.

28. The method of claim 20, wherein the first CSI-RS set and the second CSI-RS are included in a same CSI-RS resource; or
  wherein the CSI report comprises:
    a first CSI-RS resource indicator (CRI) associated with the first CSI-RS set; and
    a second CRI associated with the second CSI-RS set.

29. The method of claim 20, wherein a configuration for the first CSI-RS set is based at least in part on a configuration for the SRS; and
  wherein the configuration for the SRS comprises at least one of:
    a periodicity parameter associated with the SRS, or
    a bandwidth parameter associated with the SRS; or
  wherein a first bandwidth of the first CSI-RS set and a second bandwidth of the second CSI-RS set partially overlap; and
    wherein the CSI report is associated with a partial overlapping region of the first bandwidth and the second bandwidth.

30. The method of claim 20, wherein a first bandwidth of the first CSI-RS set and a second bandwidth of the second CSI-RS set partially overlap; and
  wherein the CSI report comprises:
    a first CSI report, associated with a non-overlapping region of the first bandwidth, that includes a first precoding matrix indicator (PMI) associated with the first CSI-RS set,
    a second CSI report, associated with a non-overlapping region of the second bandwidth, that includes a second PMI associated with the second CSI-RS set, and
    a third CSI report, associated with a partial overlapping region of the first bandwidth and the second bandwidth, that includes a joint PMI associated with the first CSI-RS set and the second CSI-RS set.

31. A user equipment (UE) for wireless communication, comprising:
  one or more memories; and
  one or more processors coupled to the one or more memories, the one or more processors individually or collectively configured to:
    transmit a sounding reference signal (SRS) that indicates that the UE is configured with a quantity of receive elements that is greater relative to a quantity of transmit elements with which the UE is configured;
    receive, based at least in part on transmitting the SRS, a first channel state information (CSI) reference signal (CSI-RS) set and a second CSI-RS set, wherein transmissions of the first CSI-RS set are precoded based at least in part on the SRS and wherein transmissions of the second CSI-RS set are non-precoded or are precoded using a precoder that is orthogonal to a precoder that is used to precode the transmissions of the first CSI-RS set; and
    transmit a CSI report that is based at least in part on the first CSI-RS set and the second CSI-RS set.

32. The UE of claim 31, wherein the first CSI-RS includes one or more CSI-RS ports associated with the SRS.

33. The UE of claim 31, wherein the one or more processors are further configured to:
  generate the CSI report based at least in part on the first CSI-RS set and the second CSI-RS set.

34. The UE of claim 31, wherein the CSI report indicates at least one of:
  a first precoder matrix indicator (PMI) associated with the first CSI-RS set,
  a second PMI associated with the second CSI-RS set,
  a joint PMI associated with the first CSI-RS set and the second CSI-RS set,
  a first rank indicator (RI) associated with the first PMI,
  a second RI associated with the second PMI,
  a joint RI associated with the joint PMI,
  a channel quality indicator (CQI) associated with the first PMI and the second PMI,
  a first CSI-RS resource indicator (CRI) associated with the first PMI,
  a second CRI associated with the second PMI, or
  a joint CRI associated with the joint PMI.

* * * * *